UNITED STATES PATENT OFFICE.

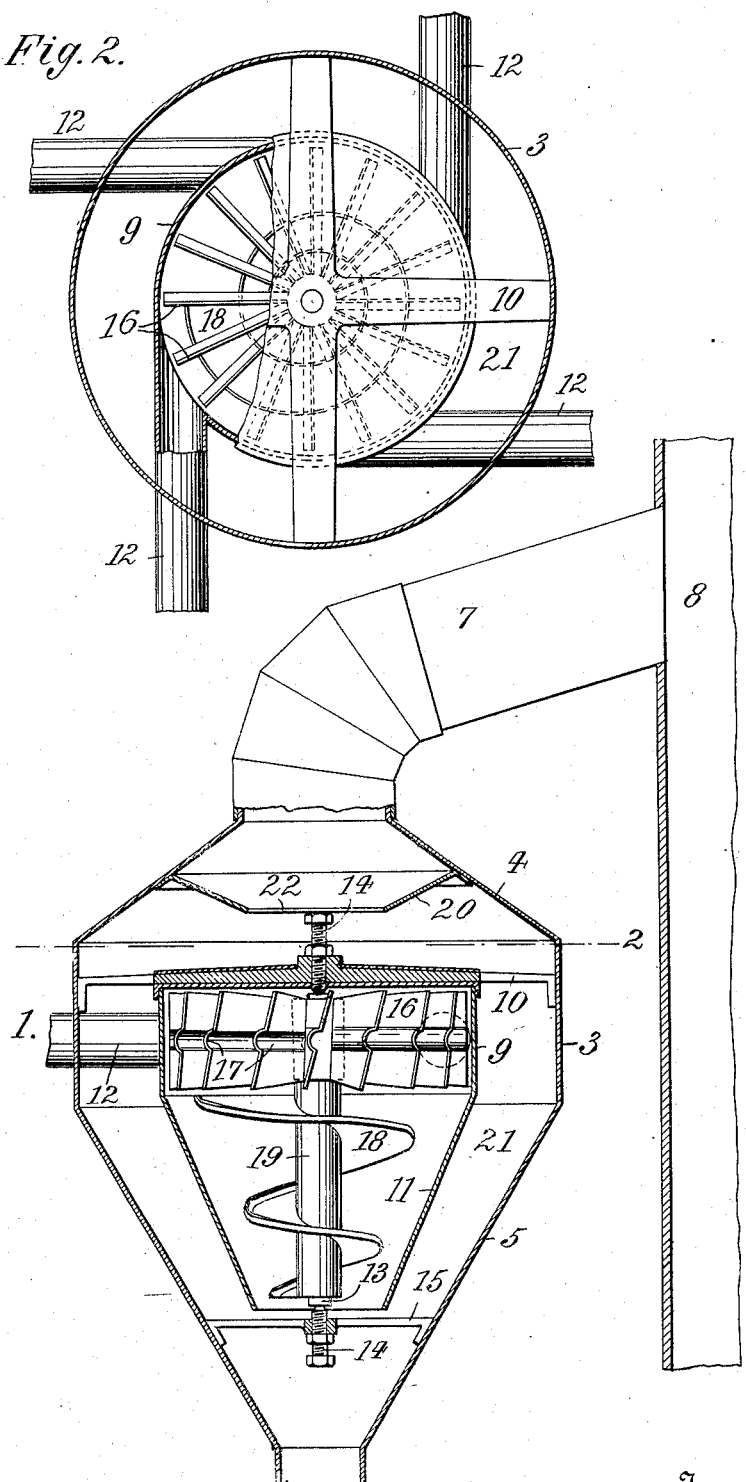

GEORGE ROTHENBÜCHER, OF NEW YORK, N. Y.

STEAM-SEPARATOR.

No. 851,254.     Specification of Letters Patent.     Patented April 23, 1907.

Application filed June 28, 1906. Serial No. 323,876.

*To all whom it may concern:*

Be it known that I, GEORGE ROTHENBÜCHER, a citizen of the United States, residing at New York city, Brooklyn, county of Kings, State of New York, have invented new and useful Improvements in Steam-Separators, of which the following is a specification.

This invention relates to an improved apparatus for separating water and oil from exhaust steam, so that the steam is not liable to form objectionable precipitates when discharged from the chimney.

In the accompanying drawing: Figure 1 is a vertical section of my improved steam separator, and Fig. 2 a horizontal section, partly broken away, on line 2—2, Fig. 1.

A head or shell 3 has a tapering neck 4 and a coniform base 5 communicating with a suitable receptacle 6 for the separated oil and water. Neck 4 communicates with an upper steam discharge pipe 7 entering chimney 8. Within shell 3 is contained a casing 9 suspended from an upper frame or spider 10. Casing 9 has an open coniform base 11 by means of which it communicates with the chamber formed within shell 3. The exhaust steam to be dried flows through inlet pipes 12 that penetrate shell 3 and open into upper part of casing 9, the pipes being arranged tangentially to the casing. Within casing 9 is centered an upright rotatable shaft 13 engaged by coned screws 14. Of these the upper screw is tapped into frame 10, while the lower screw is tapped into a lower frame 15 fitted in shell 3 below casing 9. A turbine mounted on upper part of shaft 13 has a number of blades 16 which are alined with the steam inlet pipes 12. Blades 16 are set at an inclination to shaft 13, so that the steam, on striking the lower sides of the blades, will be deflected downwards, and will, at the same time, rotate shaft 13.

Each blade 16 is provided with an outwardly opening radial groove or pocket 17 that entraps part of the steam and thereby causes the turbine to rotate with increased force. Below the turbine there is mounted on shaft 13 a worm 18 the spiral thread of which is gradually reduced in diameter from top to bottom. Worm 18 is preferably made integral with a tubular sleeve 19 fast on shaft 13. Above casing 9 there is fitted within neck 4 of shell 3 an annular conical deflector 20.

The steam entering casing 9 through pipes 12 will, by means of blades 16, rotate shaft 13 so as to rotate worm 18. Blades 16, owing to their dip, will deflect the steam downward, so that the latter is forced against the rotating worm and thereby freed from water and oil. The liquids thus separated flow through the open lower ends of casing 9 and shell 3 into cup 6. The steam freed from water and oil passes out of casing 9 and up within the annular space 21 between shell 3 and casing 9. It then passes through central opening 22 of deflector 20 and into pipe 7, which delivers it to the chimney 8, where it extinguishes any sparks that may be present.

What I claim is:

1. A steam separator composed of an inner chamber, an outer chamber communicating therewith at its lower end, a rotatable turbine and worm within the inner chamber, and an annular conical deflector at the top of the outer chamber, substantially as specified.

2. A steam separator composed of an inner chamber, an outer chamber communicating therewith at its lower end, a turbine within the inner chamber having outwardly opening grooves, and a worm operatively connected to the turbine, substantially as specified.

Signed by me at New York city, (Manhattan,) N. Y., this 26th day of June, 1906.

GEORGE ROTHENBÜCHER.

Witnesses:
  WILLIAM SCHULZ,
  FRANK V. BRIESEN.